United States Patent
Schoenberg

(10) Patent No.: US 9,578,152 B2
(45) Date of Patent: Feb. 21, 2017

(54) TELEPHONIC-BASED ENGAGEMENTS

(71) Applicant: Roy Schoenberg, Boston, MA (US)

(72) Inventor: Roy Schoenberg, Boston, MA (US)

(73) Assignee: American Well Corporation, Boston, MA (US)

(*) Notice: Subject to any disclaimer, the term of this patent is extended or adjusted under 35 U.S.C. 154(b) by 0 days.

(21) Appl. No.: 13/650,230

(22) Filed: Nov. 20, 2012

(65) Prior Publication Data

US 2014/0140489 A1 May 22, 2014
US 2015/0334214 A9 Nov. 19, 2015

Related U.S. Application Data

(63) Continuation of application No. 12/348,642, filed on Jan. 5, 2009, now abandoned, which is a continuation-in-part of application No. 11/763,680, filed on Jun. 15, 2007, now Pat. No. 7,590,550.

(51) Int. Cl.
 H04M 1/64 (2006.01)
 H04M 1/27 (2006.01)
 H04M 3/00 (2006.01)
 H04M 3/523 (2006.01)

(52) U.S. Cl.
 CPC ............... *H04M 1/271* (2013.01); *H04M 3/00* (2013.01); *H04M 3/5231* (2013.01)

(58) Field of Classification Search
 CPC ...... H04M 3/51; H04M 3/5231; H04M 3/523; H04M 3/5233; H04M 3/5238; H04M 3/5237; H04M 1/271; H04M 3/00
 USPC ........... 379/266.01, 266.02, 266.03; 705/2, 3
 See application file for complete search history.

(56) References Cited

U.S. PATENT DOCUMENTS

| | | | |
|---|---|---|---|
| 5,801,755 | A | 9/1998 | Echerer |
| 5,903,629 | A | 5/1999 | Campbell, IV et al. |
| 5,911,687 | A | 6/1999 | Sato et al. |
| 5,995,939 | A | 11/1999 | Berman et al. |
| 6,151,581 | A | 11/2000 | Kraftson et al. |
| 6,223,165 | B1 | 4/2001 | Lauffer |
| 6,322,502 | B1 | 11/2001 | Schoenberg et al. |
| 6,381,576 | B1 | 4/2002 | Gilbert |
| 6,463,417 | B1 | 10/2002 | Schoenberg |
| 6,519,570 | B1 | 2/2003 | Faber et al. |

(Continued)

FOREIGN PATENT DOCUMENTS

WO    WO 00/57326    9/2000

OTHER PUBLICATIONS

Decision in Application No. IPR2015-00924, dated Sep. 14, 2015, pp. 1-13.

(Continued)

*Primary Examiner* — Simon King
(74) *Attorney, Agent, or Firm* — Fish & Richardson P.C.

(57) ABSTRACT

Described are techniques for providing broker services to consumers and service providers based on telephonic call-back engagements. The techniques include receiving a telephonic-based communication from a consumer to consult with a service provider and determining a suitable service provider to reply to the telephonic-based communication from the consumer. The techniques add an entry corresponding to the consumer to a queue maintained for the suitable service provider, and when the consumer in the queue is at the top of the queue, initiate a call-back to a device used by the consumer.

23 Claims, 8 Drawing Sheets

(56) References Cited

U.S. PATENT DOCUMENTS

| | | | |
|---|---|---|---|
| 6,523,010 B2 | 2/2003 | Lauffer | |
| 6,546,372 B2 | 4/2003 | Lauffer | |
| 6,549,889 B2 | 4/2003 | Lauffer | |
| 6,735,569 B1 | 5/2004 | Wizig | |
| 6,801,899 B2 | 10/2004 | Lauffer | |
| 6,882,641 B1* | 4/2005 | Gallick et al. | 370/356 |
| 6,975,720 B1* | 12/2005 | Crook | 379/266.01 |
| 7,172,120 B2 | 2/2007 | Schoenberg | |
| 7,249,045 B2 | 7/2007 | Lauffer | |
| 7,308,422 B1 | 12/2007 | Faber et al. | |
| 7,412,396 B1 | 8/2008 | Haq | |
| 7,478,049 B2 | 1/2009 | Schoenberg | |
| 7,590,550 B2 | 9/2009 | Schoenberg | |
| 7,653,558 B2 | 1/2010 | Schoenberg | |
| 7,729,938 B2 | 6/2010 | Lauffer | |
| 7,818,183 B2 | 10/2010 | Schoenberg | |
| 7,840,418 B2 | 11/2010 | Schoenberg | |
| 7,865,377 B2 | 1/2011 | Schoenberg | |
| 8,396,735 B2 | 3/2013 | Lauffer | |
| 2001/0051765 A1 | 12/2001 | Walker et al. | |
| 2002/0010608 A1 | 1/2002 | Faber et al. | |
| 2002/0165732 A1 | 11/2002 | Ezzeddine et al. | |
| 2003/0023508 A1 | 1/2003 | Deep | |
| 2003/0093294 A1 | 5/2003 | Passantino | |
| 2003/0126205 A1 | 7/2003 | Lurie | |
| 2003/0144580 A1 | 7/2003 | Iliff | |
| 2003/0195838 A1 | 10/2003 | Henley | |
| 2004/0019579 A1 | 1/2004 | Herz et al. | |
| 2004/0111297 A1 | 6/2004 | Schoenberg | |
| 2004/0111298 A1 | 6/2004 | Schoenberg | |
| 2004/0111622 A1 | 6/2004 | Schoenberg | |
| 2004/0152952 A1 | 8/2004 | Gotlib et al. | |
| 2004/0153343 A1 | 8/2004 | Gotlib et al. | |
| 2004/0181430 A1 | 9/2004 | Fotsch et al. | |
| 2005/0065813 A1 | 3/2005 | Mishelevich et al. | |
| 2005/0108052 A1 | 5/2005 | Omaboe | |
| 2005/0125252 A1 | 6/2005 | Schoenberg | |
| 2005/0125254 A1 | 6/2005 | Schoenberg | |
| 2005/0125435 A1 | 6/2005 | Schoenberg | |
| 2005/0125446 A1 | 6/2005 | Schoenberg | |
| 2005/0125487 A1 | 6/2005 | O'Connor et al. | |
| 2005/0165930 A1* | 7/2005 | Whitman | G06Q 10/06311 709/226 |
| 2005/0182743 A1 | 8/2005 | Koenig | |
| 2005/0234739 A1 | 10/2005 | Schoenberg | |
| 2005/0234745 A1 | 10/2005 | Schoenberg | |
| 2005/0288965 A1 | 12/2005 | Van Eaton et al. | |
| 2006/0002538 A1* | 1/2006 | Dezonno | H04M 3/5158 379/210.01 |
| 2006/0106644 A1 | 5/2006 | Koo et al. | |
| 2006/0116900 A1 | 6/2006 | Jensen | |
| 2006/0122850 A1 | 6/2006 | Ward et al. | |
| 2006/0136264 A1 | 6/2006 | Eaton et al. | |
| 2006/0161457 A1 | 7/2006 | Rapaport et al. | |
| 2006/0247968 A1 | 11/2006 | Kadry | |
| 2007/0088580 A1 | 4/2007 | Richards, Jr. | |
| 2007/0136095 A1 | 6/2007 | Weinstein | |
| 2007/0150372 A1 | 6/2007 | Schoenberg | |
| 2007/0271117 A1* | 11/2007 | Klein | G06F 19/327 705/2 |
| 2008/0065414 A1 | 3/2008 | Schoenberg | |
| 2008/0065726 A1 | 3/2008 | Schoenberg | |
| 2008/0133511 A1 | 6/2008 | Schoenberg | |
| 2008/0275813 A1* | 11/2008 | Altberg et al. | 705/39 |
| 2008/0303811 A1* | 12/2008 | Van Luchene | A63F 13/12 345/419 |
| 2009/0063188 A1 | 3/2009 | Schoenberg | |
| 2009/0089074 A1 | 4/2009 | Schoenberg | |
| 2009/0089084 A1 | 4/2009 | Schoenberg | |
| 2009/0089085 A1 | 4/2009 | Schoenberg | |
| 2009/0089086 A1 | 4/2009 | Schoenberg | |
| 2009/0089088 A1 | 4/2009 | Schoenberg | |
| 2009/0089090 A1 | 4/2009 | Schoenberg | |
| 2009/0089096 A1 | 4/2009 | Schoenberg | |
| 2009/0089097 A1 | 4/2009 | Schoenberg | |
| 2009/0089098 A1 | 4/2009 | Schoenberg | |
| 2009/0089147 A1* | 4/2009 | Schoenberg | 705/10 |
| 2009/0150252 A1 | 6/2009 | Schoenberg | |
| 2009/0254361 A1 | 10/2009 | Schoenberg | |
| 2009/0262919 A1 | 10/2009 | Schoenberg | |
| 2009/0313076 A1 | 12/2009 | Schoenberg | |
| 2010/0189250 A1* | 7/2010 | Williams et al. | 379/266.01 |
| 2013/0182834 A1 | 7/2013 | Lauffer | |

OTHER PUBLICATIONS

Scheduling Order in Application No. IPR2015-00924, dated Sep. 14, 2015, pp. 1-7.

Application in corresponding U.S. Appl. No. 11/763,680, filed Jun. 15, 2007, pp. 1-576.

Notice of Filing Date Accorded to Petition and Time for Filing Patent Owner Preliminary Response in Application No. IPR2015-00924, dated Apr. 1, 2015, pp. 1-3.

Petition for Inter Partes Review of Claims 10-11, 23, and 30 of U.S. Pat. No. 7,590,550 in Application No. IPR2015-00924, dated Mar. 24, 2015, pp. 1-53.

Patent Owner American Well Corporation's Mandatory Notices in Application No. IPR2015-00924, dated Apr. 17, 2015, pp. 1-4.

Petitioner's Revised Mandatory Notice regarding Related Matters, in Application No. IPR2015-00924, dated Jul. 7, 2015 pp. 1-4.

Teladoc, Exhibit 1004, in Application No. IPR2016-00101, downloaded on Oct. 26, 2015, pp. 1-5.

Murphy and Bird, "Telediagnosis: A New Community Health Resource, Observations on the Feasibility of Telediagnosis Based on 1000 Patient Transactions," 64(2):113-119 (1974).

Declaration of Scott Silverman in Support of Petition for Inter Partes Review of Claims 1-42 of U.S. Pat. No. 7,835,928, in Application No. IPR2016-00101, dated Oct. 28, 2015, pp. 1-52.

Petition for Inter Partes Review of Claims 1-42 of U.S. Pat. No. 7,835,928 in Application No. IPR2016-00101, dated Oct. 28, 2015, pp. 1-63.

Declaration of Christopher R. Dillon in Support of Patent Owner's Motion for Pro Hac Vice Admission, in Application No. IRP2016-00101, dated Jan. 5, 2016, pp. 1-8.

Patent Owner American Well Corp.'s Motion for Pro Hac Vice Admission, in Application No. IRP2016-00101, dated Jan. 5, 2016, pp. 1-5.

Patent Owner American Well Corporation's Mandatory Notices, in Application No. IRP2016-00101, dated Nov. 18, 2015, pp. 1-4.

U.S. Appl. No. 60/748,955, filed Dec. 9, 2005, Ronald S. Weinstein.

Patent Owner American Well Corp.'s Motion for Pro Hac Vice Admission, in Application No. IPR2015-00924, dated Jan. 5, 2016, pp. 1-5.

Declaration of Christopher R. Dillon in Support of Patent Owner's Motion for Pro Hac Vice Admission, in Application No. IRP2015-00924, dated Jan. 5, 2016, pp. 1-8.

Patent Owner American Well Corporation's Updated Mandatory Notices in Application No. IPR2015-00924, dated Nov. 18, 2015, pp. 1-3.

Declaration of Dr. Ronald S. Weinstein, M.D., in Application No. IRP2015-00924, dated Nov. 23, 2015, pp. 1-74.

Declaration of Scott Silverman in Support of Petition for Inter Partes Review of Claims 1-9, 12-22, and 24-29 of U.S. Pat. No. 7,590,550, in Application No. IPR2016-00100, pp. 1-3.

Texas Medical Board in Application No. IPR2015-00924, dated Nov. 21, 2015, pp. 1-6.

The American Heritage Dictionary in Application No. IPR2015-00924, pp. 1-3.

Merriam-Webster's Collegiate Dictionary in Application No. IPR2015-00924, pp. 1-3.

Shorter Oxford English Dictionary in Application No. IPR2015-00924, pp. 1-4.

U.S. Appl. No. 09/918,413 in Application No. IPR2015-00924.

1395dd Examination and treatment for emergency medical conditions and women in labor, dated Oct. 21, 2011, pp. 1-7 in Application No. IPR2015-00924.

(56) References Cited

OTHER PUBLICATIONS

Medicare Program Clarifying Policies Related to the Responsibilities of Medicare dated Sep. 9, 2003, pp. 1-74 in Application No. IPR2015-00924.
843G288 Diagnostic services staff time and availability, p. 1 in Application No. IPR2015-00924.
19 CSR 30-20.092 Emergency Services in Hospitals, pp. 1-4 in Application No. IPR2015-00924.
Patent Owner American Well Corp. Response in Application No. IPR2015-00924, pp. 1-56, dated Nov. 23, 2015.
Patent Owner American Well Corp.'s Motion for Pro Hac Vice Admission in Application No. IPR2016-00100, dated Jan. 5, 2016, pp. 1-5.
Declaration of Christopher R. Dillon in Support of Patent Owner's Motion for Pro Hac Vice Admission, in Application No. IRP2016-00100, dated Jan. 5, 2016, pp. 1-8.
Patent Owner American Well Corporation's Mandatory Notices in Application No. IRP2016-00100, dated Nov. 18, 2015, pp. 1-4.
Declaration of Scott Silverman in Support of Petition for Inter Partes Review of Claims 1-9, 12-22, and 24-29 of U.S. Pat. No. 7,590,550, in Application No. IPR2016-00100, pp. 1-57.
Petition for Inter Partes Review of Claims 1-9, 12-22, and 24-29 of U.S. Pat. No. 7,590,550 in Application No. IPR2016-00100, dated Oct. 28, 2015, pp. 1-59.

* cited by examiner

TELEPHONIC-BASED ENGAGEMENTS

BACKGROUND

The present disclosure is directed to connecting consumers with service providers.

Systems have been developed to connect consumers and their providers over the Internet and the World Wide Web. Some systems use e-mail messaging and web-based forms to increase the level of connectivity between a member of a health plan and his assigned health care provider. The consumer sends an e-mail or goes to a website that generates and sends a message (typically an e-mail or an e-mail type message) to a local provider. These types of services have been broadly referred to as "e-visits."

Other health care solutions include technologically advanced telephone communication solutions that use advances in voice communication and data transmission technology to interconnect medical professionals with patients.

For instance, a professional association contracts with providers capable of providing the necessary services to consumers. Consumers call a toll-free number to request a consultation with a provider. The request is processed after the consumer hangs up the telephone and the consumer waits for a return phone call. While this arrangement can have certain advantages of potentially providing lower cost for services such as health consolations to patients, there are drawbacks.

One particular drawback is that patients wait for the return call from the physician. This can be frustrating when an immediate consultation is desired. Moreover, with the call-back, the patient may become unavailable when the physician finally calls the patient back. Accordingly, such patients may opt to visit the emergency room a local hospital instead of waiting for the return phone call.

SUMMARY

According to an aspect, a computer-implemented method includes receiving a telephonic-based communication from a consumer to consult with a service provider, determining a suitable service provider based on provider availability, that is currently available to reply to the telephonic-based communication from the consumer, adding an entry corresponding to the consumer to a queue maintained for the suitable service provider, and when the consumer in the queue is at the top of the queue, initiating a call-back to a device used by the consumer.

According to an aspect, a computer program product tangibly stored on a computer readable storage device for providing broker services to consumers and service providers, the computer program product comprising instructions for causing a computer to receive a telephonic-based communication from a consumer to consult with a service provider, determine a suitable service provider to reply to the telephonic-based communication from the consumer, add an entry corresponding to the consumer to a queue maintained for the suitable service provider; and when the consumer in the queue is at the top of the queue, and initiate a call-back to a device used by the consumer.

According to an additional aspect, an apparatus includes a processor, memory in communication with the processor, and a computer program product stored on a computer readable medium for providing broker services to consumers and service providers, the computer program product comprising instructions for causing the processor to receive a telephonic-based communication from a consumer to consult with a service provider, determine a suitable service provider to reply to the telephonic-based communication from the consumer, add an entry corresponding to the consumer to a queue maintained for the suitable service provider; and when the consumer in the queue is at the top of the queue and initiate a call-back to a device used by the consumer.

The following are some of the features within the scope of the above aspects. Initiating a call-back includes sending a telephone number of the consumer to the service provider, to have the service provider initiate the call-back between the service provider and the consumer. Initiating a call-back includes sending the call-back to the device used by the consumer and to the device used by the service provider, receiving an indication that the device used by the consumer accepted the call-back and joining a connection with the consumer device and a connection with the provider device to establish a communication channel between the device used by the consumer and the device used by the provider. A representative determines attributes of the telephonic-based communication from the consumer.

A system using an interactive voice recognition process determines attributes of the telephonic-based communication from the consumer. The consumer and the service provider are enabled to provide availability indications, and the telephone number is sent to the device used by the service provider to initiate the call-back when the availability indications for the consumer and the service provider indicate that the consumer and the service provider are both available. A time limit for the call-back is set. An indication is provided to at least one of the device used by the consumer and the device used by the service provider at a time near the time limit for the telephone call. The queue for the service provider is populated with entries from requests for on-line consultations and for telephonically received requests for consultations that are ordered in the queue according to time of arrival. A request is received from one of the consumer and the service provider to establish a telephone based call-back. A request is received from one of the consumer and the service provider to establish a telephone based communication.

One or more of the following advantages may be provided by one or more of the above aspects. Consumers can call, e.g., a toll-free number to request a consultation with a provider and the will be processed immediately. After the consumer hangs up the telephone the consumer will wait for far shorter periods for a return phone call because availability of providers is being tracked, thus providing advantages of potentially lower cost for services such as health consolations to patients, while greatly minimizing consumers' waiting time for the return call from the provider. Thus this can minimize frustration when an immediate consultation is desired. Moreover, this approach the callback model can be integrated into a real time communication channel based brokerage model.

DETAILED DESCRIPTION

Overview

The system described below provides an integrated information and communication platform that enables consumers of services to access service providers to consult and to carry out such consultations with in an efficient manner. Consumers are able to consult with an expert service provider even when the two parties are geographically separated. This integrated platform is referred to herein as telephonic-based engagement brokerage system (or depending on the context brokerage service).

Figure 1:
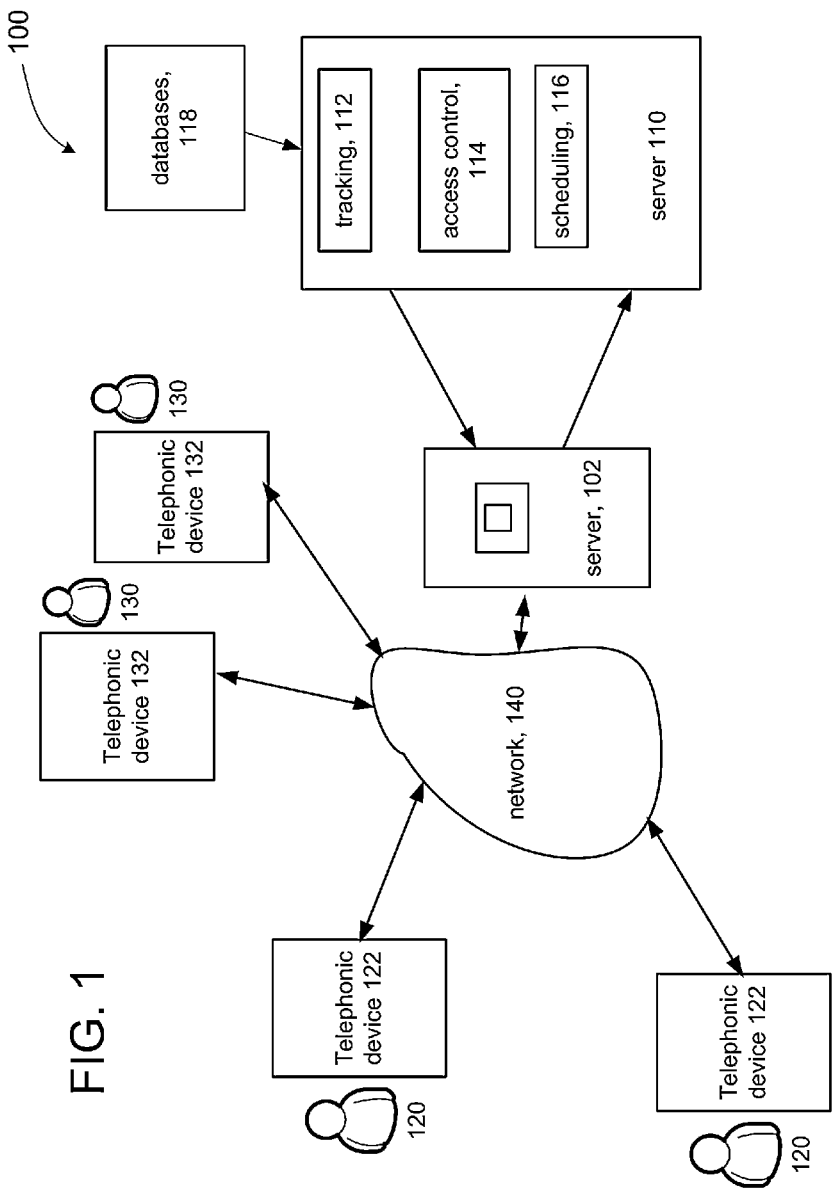
FIG. 1 is a diagrammatic view of a telephonic-based engagement brokerage system.

Referring now to FIG. 1, an exemplary networked computer system 100 having telephonic-based engagement brokerage functionality, includes a computerized system or server 110 for processing telephonic requests from consumers 120 at client systems 122 to engage with providers at provider systems 132. The networked computer system 100 implements a brokerage service embodied as a telephonic-based engagement brokerage. The networked computer system 100 during telephonic-based engagement brokerage provides information to service providers 130 at client systems 132, over a network 140, e.g., a telephonic network that can be a switched network and/or that can include the Internet (e.g., voice over IP (VOIP)). In some implementations, the networked computer system 100 includes a web server 102 to receive on-line web based requests.

In one implementation, the server 102 receives a telephone call. The telephone call is parsed to identify the particular ailment or concern, etc. of the patient 120. This parsing can be done automatically such as through an interactive voice response system using either speech recognition or a keypad-based menu system, or manually by the consumer engaging with a customer service representative (CSR).

The server 110 includes an availability or presence tracking module 112 for tracking the availability of the service providers 130. Availability or presence is tracked actively or passively. In an active system, one or more of the service providers 130 provides an indication to the server 110 that the one or more service providers are available to be contacted by consumers 120 and an indication of the mode by which the provider may be contacted. In some examples of an active system, the provider's computer, phone, or other terminal device periodically provides an indication of the provider's availability (e.g., available, online, idle, busy) to the server 110 and a mode (e.g., text, voice, video, etc.) by which he can be engaged. In a passive system, the server 110 presumes that the service provider 130 is available by the service provider's actions, including connecting to the server 110 or registering the provider's local phone number with the system. In some examples of a passive system, the server 110 indicates the provider 130 to be available at all times until the provider logs off, except when the provider is actively engaged with a consumer 120.

The server 110 also includes one or more processes in addition to the tracking module 112, such as a scheduling module 116. The server 110 accesses one or more databases 118. The components of the server 110 and the web server 102 may be integrated or distributed in various combinations as is commonly known in the art.

The networked computer system 100 allows a consumer 120 to communicate with a provider 130. In some embodiments, such as a telephonic call-back engagement, the server 110 will send to the provider sufficient information to allow the provider to call back the consumer. However, in contrast to known techniques the server 110 has chosen the provider based on criteria including current availability, as will be discussed below.

In other embodiments, the consumer 120 and provider 130 connect to the server 110 through a telephonic switch or a website or other interface on the web server 102 using client devices 122 and 132, respectively. Client devices 122 and 132 can be any combination of, e.g., personal digital assistants, land-line telephones, cell phones, computer systems, media-player-type devices, and so forth. The client devices 122 and 132 enable the consumers 120 to input and receive information as well as to communicate via video, audio, and/or text with the providers 130.

Limited by office hours and other patients, providers struggle with the idea of adding another service commitment to their existing workload. Patients sending queries to their providers cannot expect an immediate response and are often asked to schedule an appointment for further evaluation. Providers are, however, often available at times that are not convenient for their patients, for example, in the event of a last-minute cancellation. Providers also may be available for e-visits during otherwise idle times; such as when home, during their commute, and so forth. The brokerage supplements existing provider availability to allow whichever providers are available at any given time to call consumers for callback engagements or the other types of engagements mentioned above. Instead of relying on the unlikely availability of a specific provider for any given consumer, the brokerage finds for the consumer currently available providers capable of addressing the consumer's needs.

One advantage that the brokerage provides is that the brokerage constantly monitors the availability of a provider for an engagement. Thus, consumers receive relatively quick attention to address their questions or concerns. When engaging via telephone with call-back, the server 110 forwards the patient connection information to currently available service providers allowing those service providers to call-back the consumer. In order to achieve such a level of availability, the networked computer system 100 assimilates the discretionary or fractional availability windows of time offered by individual providers at stations 132 into a continuous availability perception by consumers. Consumers will have little expectation that the same provider will be constantly available, rather, they expect that some provider will be available.

The server 110 provides information and services to the consumers 120 in addition to providing connection information to service providers 130. The server 110 includes an access control facility 114 that manages and controls whether a particular consumer 120 can access the networked computer system 100 and what level or scope of access to the features, functions, and services the networked computer system 100 will provide.

The consumer 120 uses the networked computer system 100 to find out more information about a topic of interest or, for example, a potential medical condition. The server 110 identifies service providers 130 that are available at any given moment to communicate with a consumer about a particular product, service, or related topic or subject, for example, a medical condition. The server 110 facilitates establishment of communication directly by provider 130 with the consumer 120, enabling them to communicate, for example, via telephonic or video or voice communication channel (such as Voice over IP), land and mobile telephone network channels, and instant messaging or chat.

The availability of one or more providers 130 is tracked. In callback examples, when a consumer 120 desires communicate with a provider, a request is processed through intake and the server 110 determines a currently available provider for a call back.

In non-callback examples, at the instant a consumer 120 desires to connect and communicate with a provider, the server 110 determines whether that provider is available. If that particular provider 130 is available, the server 110 assesses the various modes of communication that are available forwards connection information of the consumer 120 to the service provider 130 through one or more common modes of communication. The system selects a mode of communication to use based in part on the relative utility of the various modes.

A mode for a non-callback engagement has both the consumer 120 and the provider 130 use web-based consoles, as this allows each of the other modes to be used as needed. For example, consumers and providers may launch chat sessions, voice calls, or video chats from within a web-based console like that shown in FIG. 2A, below. A web based console also provides on-demand access to records, such as the consumer's medical history, and other information. If only one of the participants in an engagement has access to a web console, the server 110 connects that participant's console to whatever form of communication the other party has available. For example, if the consumer is on the phone and the provider is using a web browser, the server 110 may connect the consumer's phone call to a VoIP session that the provider can access through the web. If the provider 130 is not available, the server 110 identifies other available providers 130 that would meet the consumer 120's needs. The server 110 enables the consumer 120 to send a message to the consumer's chosen provider.

By way of illustration, the networked computer system 100 services patients that are members of healthcare plans. For example, the service providers 130 may be physicians, and the service consumers 120 may be patients. The service providers and service consumers may also be lawyers and clients, contractors and homeowners, or any other combination of a provider of services and a consumer of services.

The system enables the consumer to search for providers that are available at the time the consumer is searching, and enables the consumer to engage a provider on a transactional basis or for a one-time consultation. A consumer can use the system for various purposes, such as a consultation or second opinion.

Many of the web-based functions are also provided by an Interactive Voice Response (IVR) system, as discussed in U.S. Pat. No. 7,590,550 entitled: "Connecting Consumers with Service Providers", the contents of which are incorporated herein in its entirety. As noted, a consumer can access the IVR system via a telephone and the server 110 parses responses into a formulation of the consumer's inquiry either by keypad entries or speech recognition technologies.

Figure 2:
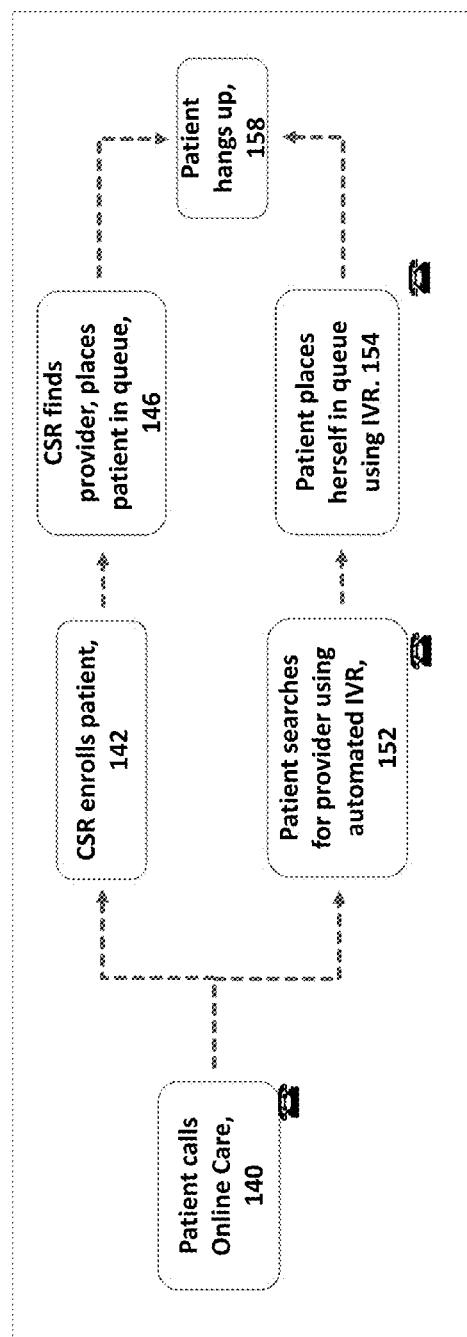
FIGS. 2 and 3 are flow charts useful in understanding the telephonic-based brokerage service.

Referring now to FIG. 2, an example processing for use in the networked computer system 100 for call-back engagements is shown. In an embodiment, a patient calls into the networked computer system 100. The server 110 through a CSR (customer service representative) enrolls 142 the patient in an online-care program offered by the system. The CRS finds a suitable provider and places 146 the patient in a queue discussed below. In an alternative, the patient searches 152 for provider using an automated IVR system. The patient after finding a suitable patient places herself in a queue using the IVR system. With either system after being placed in the queue, the patient hangs up 158. In the IVR mode mentioned, it is not intended to describe the IVR system in detail, since many logic flows for such a system are possible. Exemplary logic flows are in the above US patent. Moreover, the exact details on questions and sequences are not important to an understanding of the concepts disclosed herein.

Figure 3:
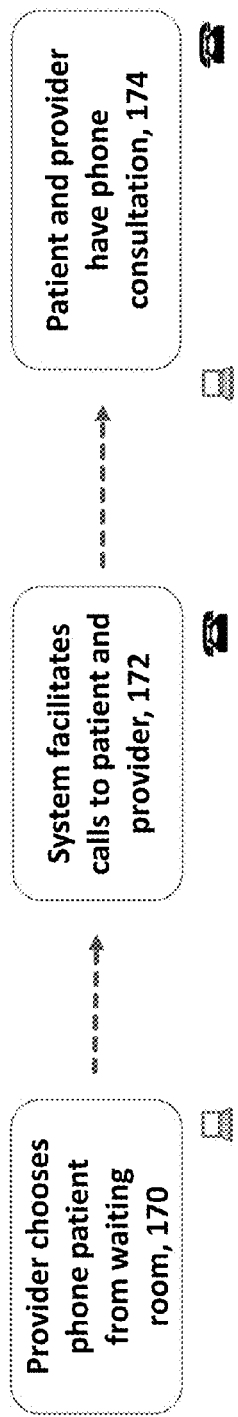

Referring now to FIG. 3, from the provider's viewpoint, the provider chooses 170 a phone patient from a virtual waiting room. The virtual waiting room can include not only phone based patients but other patients such as patients that have accessed a portion of the server 110 that is involved with real time consultations that are initialed on line rather than telephonically. System facilitates 172 calls between the patient and the provider. In one implementation, the facilitation can be as simple as passing the patient connection information to the provider and have the provider initiate a phone consultation 174 with the patient.

In other implementations, the facilitation can be establishing a real time communication channel between the patient and the provider with the channel being established through the server 110. In this other implementation, server 110 establishes the communication channel between the server 110 and a device used by the patient. Server 110 also establishes a communication channel between server 110 and a device used by the provider. To facilitate the consultation, the server 110 joins the communication channel established between server 110 and the device used by the patient with the communication channel established between the server 110 and the device used by the provider.

In the IVR system mode, the voice prompts include questions or statements that elicit information from the consumer 120 and the provider 130. The consumer 120 and the provider 130 input information by speaking into the microphone of the telephone or other terminal device and their speech is stored as received or converted to text using voice recognition. In some examples, the questions are multiple choice questions and the consumer 120 or the provider 130 responds with spoken responses or by pressing buttons on the keypad of their phone or other terminal device. The IVR system follows a logical flow and can include a menu system, in which case the consumer 120 or provider 130 moves forward or backward, or exits the system by pressing certain keys.

Figure 4:
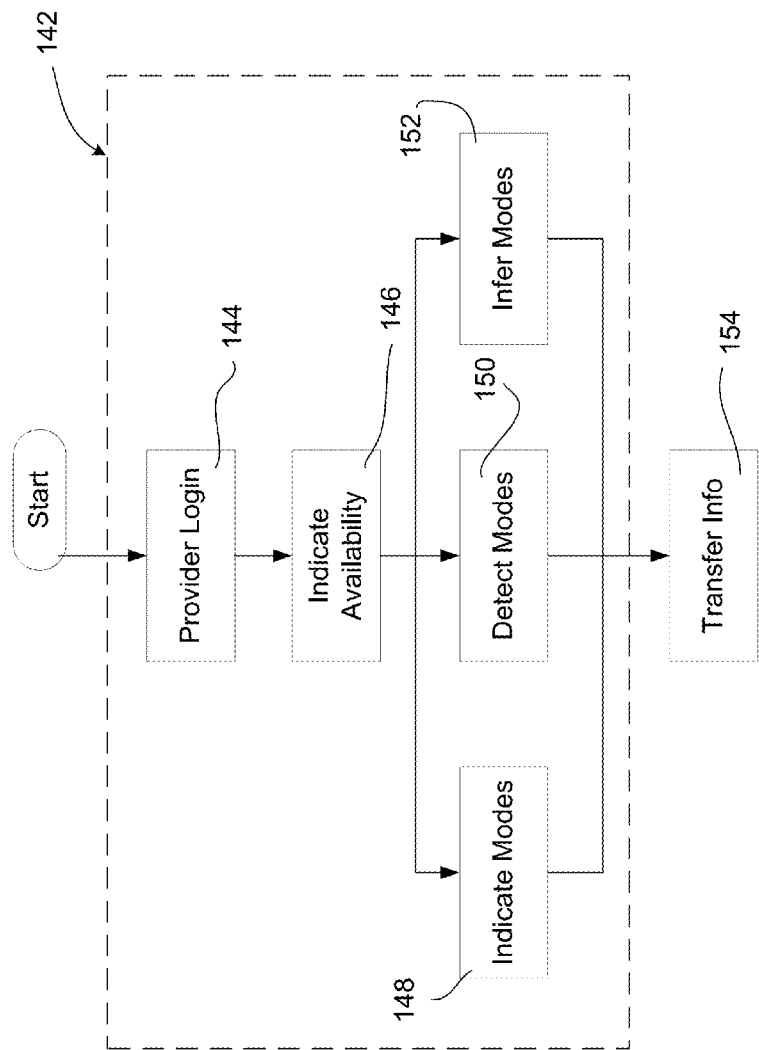
FIG. 4 is block diagram of availability processing.

Referring now to FIG. 4, the server 110 tracks 142 the availability of providers 130 and in some embodiments, on-line consumers 120. When a provider 130 logs 144 into the networked computer system 100, the provider 130 indicates 146 (such as by setting a check box or selecting a menu entry or by responding to a voice prompt) to the tracking module 112 that he or she is available to interact with consumers 120. The provider 130 can also indicate 148 to the tracking module 112 (such as by setting a check box or selecting a menu entry or by responding to a voice prompt) the modes (e.g., telephone, chat, video conference) by which a consumer 120 can be connected to the provider 130.

Alternatively, in non-callback modes, the tracking module 114 determines 150 the capabilities of the terminals 122 and 132 the consumer 120 and the provider 130 use to connect to the system (for example, by using a terminal-based program to analyze the hardware configuration of each terminal). Thus, if a provider 130 connects to the networked computer system 100 by a desktop computer and the provider has a video camera connected to that computer, the tracking module 112 determines 150 that the provider 130 can be engaged by text (e.g., chat or instant messenger), voice (e.g., VoIP) or video conference. Similarly, if a provider 130 connects to the system using a handheld device such as a PDA, the tracking module 112 determines 152 that the provider 130 can be engaged by text or voice, whereas, if the consumer connects to the networked computer system 100 via a telephone for a telephonic engagement the provider will reply with a telephone call to the consumer.

The tracking module 112 can also infer 152 a provider's availability and modes of engagement by the provider's previously provided profile information and the terminal device through which the provider connects to the system.

Providers participating in the brokerage network can have several states of availability over time. States in which the provider may be available include "on-line", in which the provider is logged-in and can immediately accept new engagements in any mode, "on-line (busy)", in which the provider is logged-in but is currently occupied in another engagement, and "scheduled", in which the provider is offline but is scheduled to be online at a designated time-point and can pre-schedule engagements for it.

While not online, the provider can take messages as in offline state. Thus, another state includes off-line, in which the provider is not logged in but can take message-based engagements (i.e., asynchronous engagements), out-of-office, in which the provider is not accepting engagements or messages, and "on call", in which the provider is offline and can be paged to go to on-line status by the brokerage network if traffic load demands it (in some examples, consumers see this state as offline).

The operating business model for the provider network employs a remuneration scheme for providers that helps assure that the consumers can find providers in designated professional domains in the online mode. For example, selected providers can be remunerated for being in the on-call mode to encourage on-line availability in case of low discretionary availability by other providers in their professional domain. On-call providers are also called into the on-line state when the fraction of on-line (busy) providers domain exceeds a certain threshold.

Figure 5A:
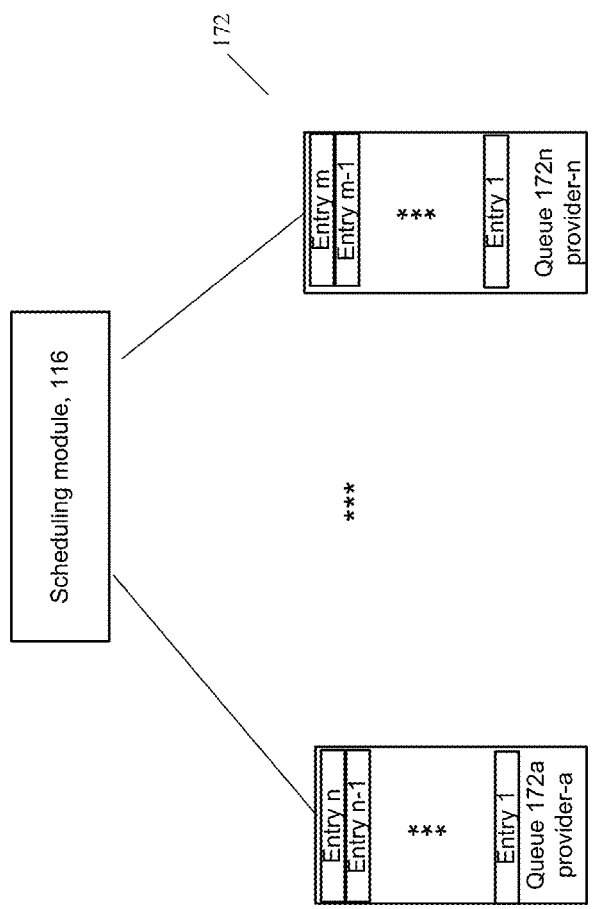
FIGS. 5A and 5B are block diagrams of queue structures.

Referring now to FIG. 5A, the tracking module 112 (FIG. 1) transfers 154 (FIG. 4) information about the availability and the communication capabilities of the consumers 120 and the providers 130 to the scheduling module 116. The scheduling module 116 uses the tracking information to schedule providers with consumers. In one scheduling algorithm, each provider is associated with a queue, e.g., 172a-172n. The queue for each provider is filled by the server 110 with entries (as depicted as entries n and entries m) that represent consumers that desire to have consultations with a provider. More specifically, as consumers access the networked computer system 100 and are processed through the intake process, entries representing the consumers are produced by the server 110 and those entries are queued.

In one embodiment, the server 110 stores the entries in queues of those providers that the server determines has the least number of entries, in order to balance provider utilization across the system 100, and to otherwise minimize overall response time for consumers. The server 110 will use a first in first out priority scheme to retrieve records from the query in order to furnish information to providers for servicing clients such as through call-backs.

Thus, in a telephonic engagement, as described above, after intake processing (or alternatively before intake processing has been completed) the server 110 produces an entry for storage in one of the queues (generally 172). The server 110 examines the queues 172a-172n of all providers that are suitable to provide a consultation with the consumer and the server chooses the queue of a suitable provider that has the least number of entries waiting to be processed. The queue, e.g., queue 172a of the chosen provider (provider-a) is loaded with that entry. A telephonic call-back engagement can be either one that is a scheduled engagement where the server 110 provides a time for the call-back based on when each of the consumer and provider are available or a non-scheduled call-back based on the available provider.

In servicing consumer requests, for a particular provider, the server 110 retrieves the entry of a consumer that is next to be serviced (generally the oldest entry in the queue 172). As the provider services that consumer, the server 110 removes the corresponding entry from that provider's queue and then the server 110 promotes all remaining entries in that queue such that the next entry in the queue to be serviced will be now be the oldest entry.

Figure 5B:
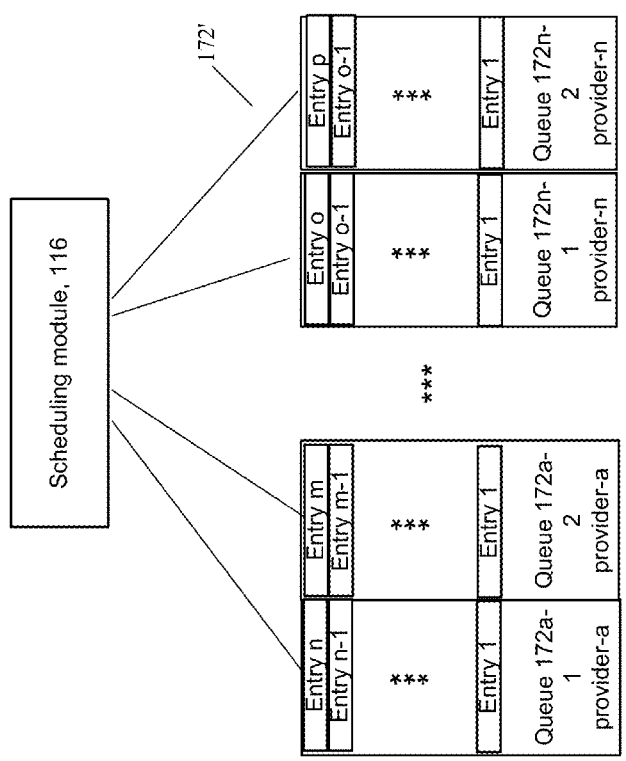

In an alternative embodiment, as shown in FIG. 5B, the queues (generally 172') for each provider are sub-divided or represented as plural sub-queues with each of the sub-queues corresponding to an appointment "state." In FIG. 5B, two queues 172a-1 to 172a-2 and 172n-1 to 172n-2 are shown for each of the providers, e.g., "provider a" to "provider n" with the sub-queues 172a-1 to 172a-2 and 172n-1 to 172n-2 representing, "waiting room" and "scheduled appointments" of the respective providers "provider a" to "provider n."

In this embodiment, the server using scheduling module 116, examines the queues of all providers that are suitable to provide a consultation with the consumer and chooses the appropriate sub-queue of a suitable provider that has the least number of entries waiting to be processed for the particular state, e.g., "waiting room" and "scheduled appointments." More specifically, for "telephonic engagements" the server loads entries into the waiting room queue of the particular provider that has the fewest entries.

In servicing requests, for a particular provider, the system retrieves the entry of a consumer that is next to be serviced from the waiting room for that provider. The next to be serviced is according to the following priority the oldest entry in the waiting room, unless the server determines that the scheduled appointment queue of the provider has either an entry for a scheduled telephonic callback or scheduled appointment that has an scheduled appointment time that is either equal to the current time or would be within a time window where the servicing of a waiting room entry or a new request would adversely impact servicing of scheduled telephonic callback or scheduled appointment queued entries. For example, in some embodiments the system 100 could allocate a set time period of, e.g., 15 minutes to service a request. Accordingly, the server 110 would not select an entry from the waiting room queue if there was a scheduled appointment in, e.g., 10 minutes.

Telephonic engagements without any scheduling will generally be placed in and thus serviced from the waiting room sub-queue.

As the provider services a consumer from its sub-queue all remaining entries (representing other consumers) in that sub-queue are promoted such that the next entry in the sub-queue to be serviced will be the next oldest entry.

In another embodiment, the server 110 stores all incoming telephonic call-back engagements in a waiting room queue along with other types of engagements. One queue is used for all providers and the scheduling module 116 examines the queue and chooses the provider that is next available.

Figure 6:
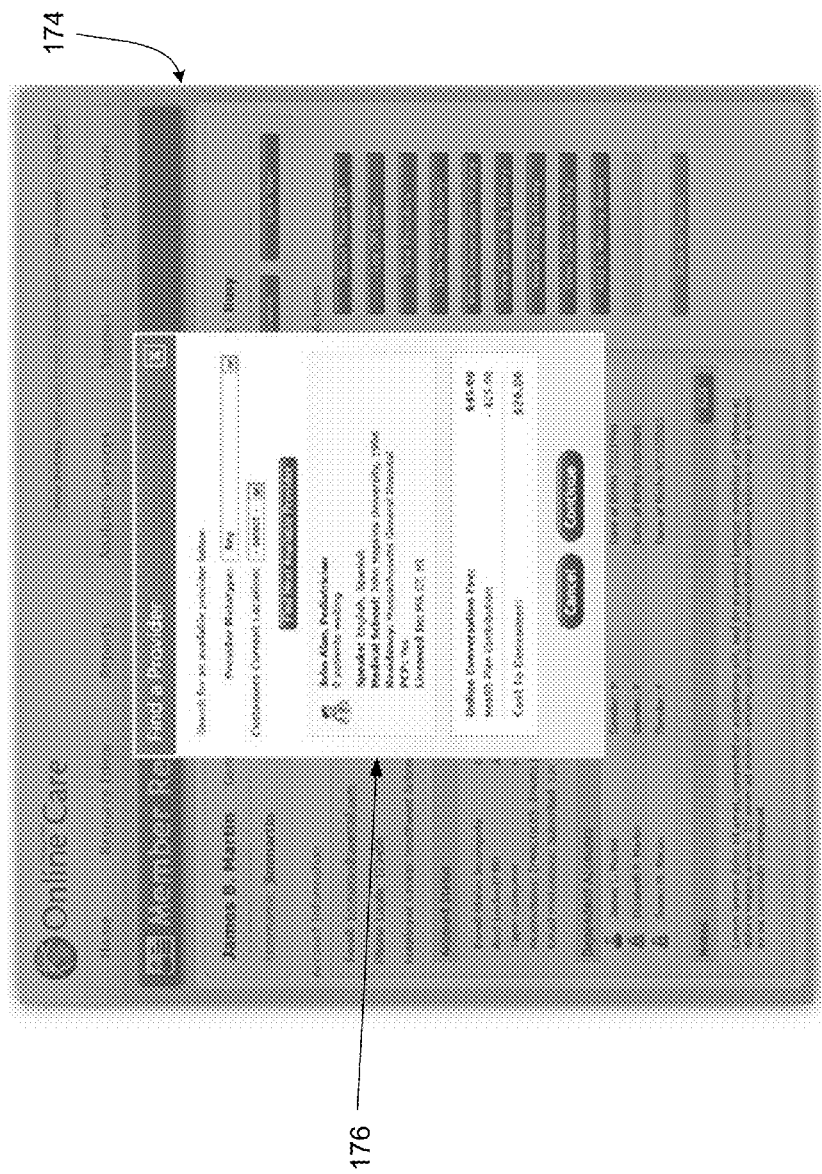
FIGS. 6 and 7 are screenshots of graphical user interfaces.

Referring now to FIG. 6, in the call-back CSR assisted mode, a customer service representative is presented with an interface 174 that has various information regarding a consumer (shown in background). A find provider screen 176 is launched where the CSR can select provider meta type which is "any" or various specialties (not shown), consumer location (labeled customer current location) that has standard locations. The screen 176 presents a price that can be conveyed to the customer and the CSR then selects continue to initiate the intake for the call back engagement.

Figure 7:
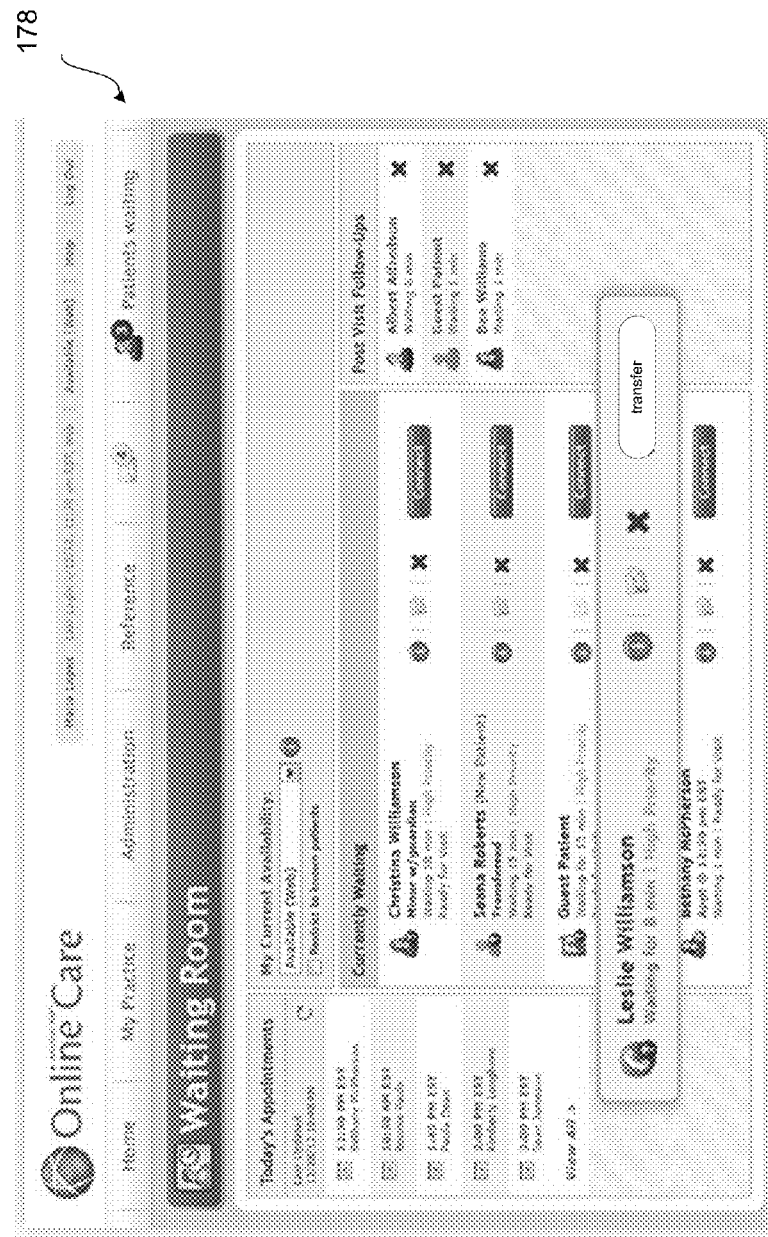

Referring now to FIG. 7, in the call-back CSR assisted mode, the customer service representative is presented with an interface 178 that displays a provider's waiting room. The interface shows consumers that are presently waiting, the consumers availability status, priority, etc. Connect controls are also shown. The connect controls allow the system to initiate a call. A find provider screen 176 is launched where the CSR can select provider meta type which is "any" or various specialties (not shown), consumer location (labeled customer current location) that has standard locations. The screen 176 presents a price that can be conveyed to the customer and the CSR then selects continue to initiate the intake for the call back engagement.

As noted, the server 110 includes access control facilities 114 that control how consumers 120 access the system and to what extent or level the services provided by the system are made available to consumers. The server 110 also stores and provides access to consumer information (e.g., contact information, credit and financial information, credit card information, health information, and other information related to the consumer and the services purchased or otherwise used by the consumer) and provider information (e.g., physician biographies, product and service information, health related content and information and any information the provider or the health plan wants to make available to members) and the access control facility 114 can prevent unauthorized access to this information. In some examples, the server 110 exports the consumer information for use in a provider's office or other facility.

In some implementations of the networked computer system 100 consumers access the either on-line and/or through the telephonic engagements discussed above. In other implementations, of the brokerage system 100 access is only through telephonic engagements. In this later instance, the queue structures can be greatly simplified. Several types of engagements may exist, e.g., "consumer-initiated engagements" "follow-up engagements" and "pre-scheduled engagements" and "standby engagements."

In some embodiments, consumers may select providers according to attributes of the provider, such as a geographical area where the provider is located or which professional organizations have accredited the provider (e.g., whether a doctor has board certification in cardiology). Any metrics within the provider profile can be used to define a list of providers that meet the consumer's preferences. In this case, the system will use the consumer's selection to override the least used scheme for populating provider queues.

Modes of Engagement

Telephonic Callbacks—

Consumers who wish for a telephonic consultation with a provider may use a traditional telephone to enter information, as discussed above, and hangs up and waits for a call-back from a suitable provider, as also discussed above. Providers are sent information concerning the consumer in order to understand the consumer's issue and a telephone number by which the provider contacts the consumer.

In some embodiments of the networked computer system 100, the networked computer system 100 allows consumers to engage provider's e.g., health professionals "on demand" based on provider availability. These engagements can be established in various ways as described in the above mentioned patent. These types of engagements include:

Passive Browsing—

Reference health content is accessed on the brokerage's website. The website can support the use of licensed content packages from other vendors to meet the variable preferences of health plans. For example, key content vendors include Healthwise™, ADAM™, Mayo Clinic™ and HealthDay™. Content libraries provided by such vendors offer a combination of articles, imagery, interactive tutorials and related tools that allow consumers to access content relevant for their health issues. Many health plans and major employers already possess a license for the use of one of these content packages.

Health Risk Assessments—

The system acquires information from consumers through automated interaction (e.g., rules-based interaction) in order to crystallize their needs (e.g., medical risks) and better direct them. Assessments span from general health to very specific medical conditions and follow a path of questioning that dynamically tailors itself based on information already retrieved (e.g., using predefined rules). As assessments progress, the system constructs engagement suggestions that the consumer can exercise. Each suggestion represents both the question to the provider and the type of provider appropriate to answer it. Consumers may choose to simply launch such engagements or apply their own discretion as to the phrasing and the selection of the recipient provider. This is discussed in more detail below in the context of the consumer advisor.

Asynchronous Correspondence—

The lowest level of true provider interaction is by way of secure messaging. The question or topic of the engagement is sent to a selected provider (whether online or not) and can be answered by this provider at her leisure. Turnaround times are monitored by the system and are part of the credentials of the provider used for her selection by consumers. The system informs the consumer once a response has been received and can allow the consumer to redirect the question if he needs more urgent response time. For example, typical types of asynchronous correspondence include e-mail, instant messaging, text-messaging, voice mail messaging, VoIP messaging (i.e., leaving a message using VoIP), and paper letters (e.g., via the U.S. Postal Service).

Synchronous Correspondence—

Several forms of synchronous correspondence allow the consumer and the provider to engage in real-time discussions.

Synchronous Text Correspondence—

This may be referred to as a "Chat" module where both sides of the engagement type their entries in response to each others' entries. The form of communication may be entirely text based but is still a live communication. Examples include instant messaging and SMS messaging.

Web-Based Teleconferencing—

The use of broadband network connections allows for real-time voice transmission over the Internet in what is referred to as full duplex (i.e., both voice channels are open at the same time). Consumers can opt to have a voice conversation with their providers using, for example, their computer's speakers and microphone. Web-based teleconferencing may use VoIP, SIP, and other standard or proprietary technologies.

Telephonic Conferencing—

Consumers who wish for a direct telephonic communication with a provider or who are not comfortable using their computer may use a traditional telephone for interaction with a provider. The consumer may use a dial-in number and an access code that connects him to the brokerage's servers. Providers are linked to the servers via VoIP, other data-network-based voice systems, or their own telephones. Telephonic conferencing may also allow consumers to request "call me now" functions, in which the provider calls the consumer (directly or through the brokerage).

Video Conferencing—

The system can support video conferencing to allow consumers to exhibit physical findings to providers if such disclosure is needed. Consumers and providers may also simply prefer face-to-face communication, even if remote. Small digital cameras, referred to as webcams, attached to or built in to personal computers or laptops can be used for this purpose. Video conferencing can be provided by standard software or by custom software provided by the brokerage. Alternatively, dedicated video conferencing communication equipment or telephones with built-in video capabilities can be used.

Semi Synchronous Correspondence—

Some engagements of a consumer with an online provider include both synchronous and asynchronous interactions. Part of the engagement takes place by immediate messaging between the two, but the provider may ask the consumer to take occasional asynchronous assessments if, for example, a generic line of question is desired. This allows the provider to operate more than one consumer engagement at a time while each consumer is constantly engaged. For example, semi-synchronous correspondence includes a combination of e-mail, instant messaging, test messaging, voice calls and mail messaging, and VoIP calls and VoIP messaging.

Interactive Voice Response Engagements

Interactive Voice Response (IVR) systems allow for the deployment of interactive audio menus over the phone. The caller can navigate between options, listen to data-driven information, provide meaningful input, and engage system functions. IVR engagements extend the reach of the system to the telephone as a portable consumer interface to launch an engagement in addition to the Web-based interface. Consumers select a pin code on the application to authenticate their identity if they call in. Several types of engagements can be carried out through an IVR system using suitable logic such as described in the Patent. For dial-in engagements, the consumer calls in and invokes a telephonic engagement with an available provider. The IVR system extends the consumer's ability to select a provider to the phone so that the consumer's interaction resembles one carried out on the Web.

The IVR system can also be used proactively to pursue consumers who need a follow-up. At the time of a follow-up, the system recalls the provider with whom the follow-up is desired (or the type of provider in case the follow-up is not restricted to a specific provider), identifies that the provider is available for an engagement, and attempts to contact the consumer over the phone to establish a connection for the engagement. Once contacted, the consumer can decline or ask postpone the call. If the consumer takes the call, the connection is made. When consumers are pursuing an engagement with a provider that is either busy or currently offline, the IVR system allows the consumer to park in a standby mode until the provider is available. When the provider is available, the system calls the consumer, identifies the provider to the consumer, and verifies that the consumer is still interested in pursuing the call with the provider. If the consumer is still interested, an engagement is connected.

In addition to launching engagements, the IVR interface allows consumers to interact with other services offered by the brokerage. For example, consumers can instruct the system to fax a transcript of their information to a fax machine that the consumer identifies by keying in or speaking its phone number. Using such a function, a consumer makes key information available to, e.g., emergency room personnel or to a provider in an office visit, without the need to plan, collect, print, and carry the information to that encounter.

IVR hardware is readily available from telecommunication vendors and can be programmed to operate in the context of the brokerage framework. Authentication is provided through a PIN number or by other standard methods.

The consumer information collected by the intake process may be stored in the databases 118 as part of the overall brokerage. In some examples, the consumer information is protected and secured from unauthorized access and in compliance with the various legal requirements for storing private consumer information (for example, HIPPA governs access to an individual's health care information). The database 118 may also the process logic and rules data including the business logic of an application or rules for a rules engine that implements the consumer advisor module.

The brokerage extends the result of any engagement to a physical point of care or service provider to allow continuation or escalation of services beyond those provided in the electronic encounter.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A computer-implemented method comprising:
receiving a communication from a consumer to consult with a service provider;
determining one or more suitable service providers based on a geographic location of the consumer and which of one or more service providers are licensed to provide medical services in the geographic location;
identifying, by a computer system from a plurality of service provider queues for different service providers, a service provider queue that is maintained only for a suitable service provider licensed to provide medical services in the geographic location of the consumer;
wherein the service provider queue is assigned to a particular service provider for filling with entries that represent consumers that desire to have consultations with the particular service provider;
adding an entry corresponding to the consumer to the service provider queue maintained for the suitable service provider; and
when the suitable service provider is presently available, initiating a call-back or a text-based communication to a device used by the consumer, with presently available specifying that the service provider is online and not engaged in a consultation.

2. The method of claim 1, wherein initiating a call-back further comprises:
sending a telephone number of the consumer to the service provider, to have the service provider initiate the call-back between the service provider and the consumer.

3. The method of claim 1, wherein initiating a call-back further comprises:
sending the call-back to the device used by the consumer and to the device used by the service provider;
receiving an indication that the device used by the consumer accepted the call-back; and
joining a connection with the consumer device and a connection with the provider device to establish a communication channel between the device used by the consumer and the device used by the provider.

4. The method of claim 1, further comprising:
determining by a representative attributes of the communication from the consumer.

5. The method of claim 1, further comprising:
determining from an interactive voice recognition process attributes of the communication from the consumer.

6. The method of claim 5, further comprising providing an indication to at least one of the device used by the consumer and the device used by the service provider at a time near a time limit for a telephone call.

7. The method of claim 5, wherein the service provider queue for the service provider is populated with entries from requests for on-line consultations and for telephonically received requests for consultations that are ordered in the service provider queue according to time of arrival.

8. The method of claim 1, further comprising:
enabling the consumer and the service provider to provide availability indications; and wherein sending further comprises:
sending the telephone number to the device used by the service provider to initiate the call-back when the availability indications for the consumer and the service provider indicate that the consumer and the service provider are both available.

9. The method of claim 1, further comprising setting a time limit for the call-back.

10. The method of claim 1, further comprising receiving a request from one of the consumer and the service provider to establish a telephone based call-back.

11. The computer-implemented method of claim 1, wherein identifying the service provider queue that is maintained for the suitable service provider comprises identifying a service provider queue that is maintained for a selected one of the one or more suitable service providers.

12. A computer program product tangibly stored on a computer readable storage device for providing broker services to consumers and service providers, the computer program product comprising instructions for causing a computer to:
receive a communication from a consumer to consult with a service provider;
determine one or more suitable service providers based on a geographic location of the consumer and which of one or more service providers are licensed to provide medical services in the geographic location;
identify, from a plurality of service provider queues for different service providers, a service provider queue that is maintained only for a suitable service provider licensed to provide medical services in the geographic location of the consumer;
wherein the service provider queue is assigned to a particular service provider for filling with entries that represent consumers that desire to have consultations with the particular service provider;
add an entry corresponding to the consumer to the service provider queue maintained for the suitable service provider; and
when the suitable service provider is presently available, initiating a call-back or a text-based communication to a device used by the consumer, with presently available specifying that the service provider is online and not engaged in a consultation.

13. The product of claim 12, wherein instructions to initiate a call-back further comprise instructions to:
send a telephone number of the consumer to the service provider, to have the service provider initiate the call-back between the service provider and the consumer.

14. The product of claim 12, wherein instructions to initiate a call-back further comprise instructions to:
initiate a telephonic call-back to the device used by the consumer and to the device used by the service provider;
receive an indication that the device used by the consumer accepted the call-back; and
join a connection with the consumer device and a connection with the provider device to establish a communication channel between the device used by the consumer and the device used by the provider.

15. The product of claim 12, further comprises instructions to:
determine attributes of the communication from the consumer.

16. The product of claim 12, further comprises instructions to:
determine from an interactive voice recognition process attributes of the communication from the consumer.

17. The product of claim 12, further comprises instructions to:

enable the consumer and the service provider to provide availability indications; and wherein sending further comprises:

send the telephone number to the device used by the service provider to initiate the call-back when the availability indications for the consumer and the service provider indicate that the consumer and the service provider are both available.

18. The product of claim 12, further comprises instructions to:

set a time limit for the call-back.

19. The product of claim 18, further comprises instructions to:

provide an indication to at least one of the device used by the consumer and the device used by the service provider at a time near a time limit for a telephone call.

20. The product of claim 12, further comprises instructions to:

receive an indication that extends the length of a telephone call between the consumer and the service provider.

21. The product of claim 12, further comprises instructions to:

receive a request from one of the consumer and the service provider to establish a telephone based communication.

22. An apparatus comprising:

a processor;

memory in communication with the processor; and a computer program product stored on a computer readable medium for providing broker services to consumers and service providers, the computer program product comprising instructions for causing the processor to:

receive a communication from a consumer to consult with a service provider;

determine one or more suitable service providers based on a geographic location of the consumer and which of one or more service providers are licensed to provide medical services in the geographic location;

identify, from a plurality of service provider queues for different service providers, a service provider queue that is maintained only for a suitable service provider licensed to provide medical services in the geographic location of the consumer;

wherein the service provider queue is assigned to a particular service provider for filling with entries that represent consumers that desire to have consultations with the particular service provider;

add an entry corresponding to the consumer to the service provider queue maintained for the suitable service provider; and when the suitable service provider is presently available, initiate a call-back or a text-based communication to a device used by the consumer, with presently available specifying that the service provider is online and not engaged in a consultation.

23. The apparatus of claim 22, wherein instructions to initiate a call-back further comprise instructions to:

send a telephone number of the consumer to the service provider, to have the service provider initiate the call-back between the service provider and the consumer.

* * * * *